United States Patent [19]

Morita et al.

[11] 4,306,033

[45] Dec. 15, 1981

[54] HIGHLY HYDROPHILIC AND POROUS SINTERED BODY MADE OF THERMOPLASTIC POLYACRYLONITRILE RESIN

[75] Inventors: Yosisige Morita, Hachioji; Akiko Baba, Yokohama, both of Japan

[73] Assignee: Spacy Chemical Corporation, Tokyo, Japan

[21] Appl. No.: 231,812

[22] Filed: Feb. 5, 1981

Related U.S. Application Data

[63] Continuation of Ser. No. 62,458, Jul. 30, 1979, abandoned.

[30] Foreign Application Priority Data

Aug. 10, 1978 [JP] Japan .................................. 53-96608

[51] Int. Cl.$^3$ .............................................. C08J 9/24
[52] U.S. Cl. .................................... 521/82; 264/126; 521/140; 521/919
[58] Field of Search ................ 264/126; 521/134, 139, 521/140, 149, 919, 82

[56] References Cited

U.S. PATENT DOCUMENTS

| | | | |
|---|---|---|---|
| 2,843,883 | 7/1958 | Rockoff | 521/919 |
| 3,267,187 | 8/1966 | Slosberg et al. | 521/919 |
| 3,713,890 | 1/1973 | Strier et al. | 264/126 |
| 4,158,688 | 6/1979 | Pett et al. | 264/126 |

FOREIGN PATENT DOCUMENTS 679549  9/1952  United Kingdom ................ 264/126

*Primary Examiner*—Morton Foelak
*Attorney, Agent, or Firm*—Jordan and Hamburg

[57] ABSTRACT

According to the invention, there is provided a highly hydrophilic and porous sintered body having open-cellular pores and including a polypyridine ring structure represented by the following formula of:

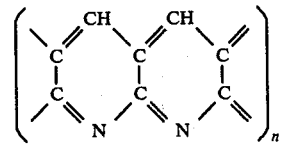

(wherein n is an integer.) which is obtained by sintering a pulverized copolymer made from acrylonitrile, a conjugated diene monomer and an $\alpha,\beta$-unsaturated olefinic carboxylic ester represented by the following formula of:

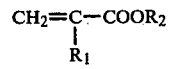

(wherein $R_1$ is hydrogen, a lower alkyl group having 1 to 4 carbon atoms or a halogen; and $R_2$ is an alkyl group having 1 to 6 carbon atoms.)

6 Claims, No Drawings

HIGHLY HYDROPHILIC AND POROUS SINTERED BODY MADE OF THERMOPLASTIC POLYACRYLONITRILE RESIN

This is a continuation of application Ser. No. 62,458, filed July 30, 1979, now abandoned.

BACKGROUND OF THE INVENTION

1. Field of the Invention

The present invention relates to a highly hydrophilic and porous sintered body made of a thermoplastic polyacrylonitrile resin.

2. Prior Art

Many proposals have been conventionally made to produce an open-cellular porous sintered body prepared from a pulverulent thermoplastic resin.

For example, Japanese Patent Publication No. 6385/1957 discloses a method of producing a porous sintered body of polyethylene by heating to sinter a pulverulent polyethylene at a temperature of from 100° C. to the temperature at which decomposition and/or gelation of the polyethylene does not occur. Japanese Patent Publication No. 5435/1958 discloses a method of producing a porous sintered body of polyethylene by heating to sinter a pulverulent polyethylene having a molecular weight of more than 75,000 at a temperature of higher than 120° C. However, these prior art sintered bodies of polyethylene are non-hydrophilic and hence not suited as the materials for manufacturing filters, inking rollers and tips of sign pens which require hydrophilic properties. Moreover, these prior art sintered bodies are inferior in porosity and hardness.

Japanese Patent Publication No. 2582/1961 discloses a method of producing a porous sintered article comprising the steps of heating a pulverulent linear polyamide at a temperature of higher than 250° F. and lower than the melting point of the polyamide, cold-pressing after cooling, and then sintering the thus pressed article in a non-oxidative atmosphere. However, this prior art sintered body of polyamide is feebly hydrophilic and has the disadvantage that difficulties are encountered in the sintering operation since the melting point of the polyamide is relatively high and it tends to decompose when heated to a temperature near the melting point thereof. A further disadvantage of such sintered body of polyamide is the difficulty in producing a sintered article having open-cellular pores.

OBJECTS AND SUMMARY OF THE INVENTION

An object of the present invention is to provide a highly hydrophilic and porous sintered body.

Another object of the invention is to provide a highly hydrophilic and porous sintered body which is increased in porosity and yet improved in hardness.

A further object of the invention is to provide a highly hydrophilic and porous sintered body having open-cellular pores of uniform cell size.

A further object of the invention is to provide a highly hydrophilic and porous sintered body which has a smooth and well finished surface.

A further object of the invention is to provide a highly hydrophilic and porous sintered body which has increased mechanical strength.

The above and other objects of the invention will be more clearly understood from the following description.

According to the present invention, there is provided a highly hydrophilic and porous sintered body having open-cellular pores and including a polypyridine ring structure represented by the following general formula of:

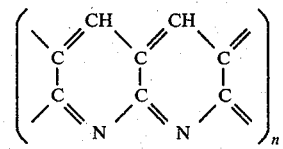

(wherein n is an integer). The sintered body is produced by sintering a pulverized thermoplastic polyacrylonitrile copolymer made from acrylonitrile, a conjugated diene monomer and an $\alpha,\beta$-unsaturated olefinic carboxylic ester represented by the following general formula of:

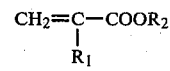

(wherein $R_1$ is hydrogen, a lower alkyl group having 1 to 4 carbon atoms or a halogen; and $R_2$ is an alkyl group having 1 to 6 carbon atoms).

DESCRIPTION OF THE INVENTION

While in the present invention, said copolymer is prepared by copolymerizing acrylonitrile and a conjugated diene monomer with an $\alpha,\beta$-unsaturated olefinic carboxylic ester which is represented by the general formula of

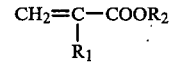

wherein $R_1$ is hydrogen, a lower alkyl group having 1 to 4 carbon atoms or a halogen and $R_2$ is an alkyl group having 1 to 6 carbon atoms. Examples of the $\alpha,\beta$-unsaturated olefinic carboxylic ester which may be used in the invention are methyl acrylate, ethyl acrylate, propyl acrylate, butyl acrylate, amyl acrylate, hexyl acrylate, methyl methacrylate, ethyl methacrylate, propyl methacrylate, butyl methacrylate, amyl methacrylate, hexyl methacrylate, $\alpha$-chloromethyl acrylate and $\alpha$-chloromethyl methacrylate. Among them, the most preferred carboxylic esters are methyl acrylate, ethyl acrylate and methyl methacrylate. On the other hand, the conjugated diene monomer usable in the present invention includes butadiene-1,3, isoprene, chloroprene, bromoprene, cyanoprene, 2,3-dimethyl-butadiene-1,3 and 2-ethyl-butadiene-1,3. Inter alia, butadiene and isoprene are the most preferred ones since they are easily available and also capable of being readily copolymerizable.

Said thermoplastic polyacrylonitrile copolymer used in the present invention may be preferably prepared by copolymerizing the starting materials to above at 0° C. to 100° C. in an aqueous medium preferably in the presence of an emulsifier and a free-radical forming polymerization initiator and in the absence of molecular oxygen.

When using any resins other than said thermoplastic polyacrylonitrile copolymer, a highly hydrophilic and porous sintered body which is increased in porosity and yet improved in hardness can not be produced, as will be described in detail hereinbelow.

As to the principal theory in connection with the sintering technique, Mr. Frenkel proposed the following fusing rate equation (1) earlier in 1945:

$$X^2 = \frac{3a\gamma t}{2\eta} \qquad (1)$$

According to him, said fusing rate equation (1) should be established on the thermodynamical assumption that in a particle system composed of two equal spheres contacting each other, the total superficial area of the spheres is descreased by heating to result in reduction in free energy. In the equation referred to above, X is the radius of curvature of the contacting surfaces of the two equal spherical particles, a is the radius of the spheres, $\gamma$ is the surface tension, t is the heating time and $\eta$ is the viscosity of the resin at the sintering temperature.

As will be clear from Equation (1), the time required for sintering is in direct proportional to the radius of the resin particle and the melt viscosity and in reverse proportional to the surface tension. The time t is shortened at a higher temperature and prolonged at a lower temperature, as a matter of course. It is noted here that the surface tension $\gamma$ and the viscosity $\eta$ are the factors greatly depending on the molecular arrangement and the molecular weight (degree of polymerization), and these factors intimately correlate with one another.

As will be readily understood from Equation (1) set forth above, fusing proceeds easier as the particle radius becomes the smaller. As a result, small pores of the sintered body are crushed to become smaller and the sintered body loses its porosity. On the other hand, if the sintering temperature is lowered or the sintering time is shortened, the sintered body becomes crumbled due to incomplete fusing resulting in inferior mechanical strength. For this reason, it is obviously difficult to satisfy said Equation (1) and to provide a resin which may be sintered in conformity with this Equation. This has been repeatedly experienced by ourselves in the course of investigations. Nevertheless it has been found that the thermoplastic acrylonitrile copolymer of the present invention may be sintered to exhibit superior sintering properties while being virtually in conformity with the conditions expressed in said Equation (1).

The advantageous characteristics of said thermoplastic acrylonitrile copolymer when used as a sintered resin in the present invention reside in (1) that it is highly viscous in the molten state, and (2) that the viscosity thereof at the sintering temperature is not lowered but rather increased within a certain temperature range. A further advantage of this copolymer resin resides in (3) that the change in viscosity is not appreciable, which is attributed to the fact that this resin includes nitrile groups at high content (average content being about 75% by weight) in its intramolecular chain so that when it is held in air at a raised temperature of higher than 200° C. some portions of the nitrile groups are opened to be converted to polypyridine ring structures having conjugated double bonds as follows:

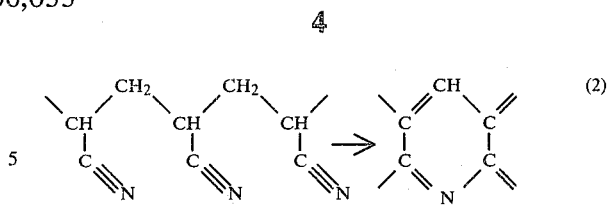

Accompanying with the formation of polypyridine rings, as represented by the Equation (2) above, the $\pi$-electron orbits expand extensively over the rings to facilitate the formation of hydrogen bonds with $H_2O$ molecules to render the resin highly hydrophilic.

In an endeavour to obtain a highly hydrophilic and porous sintered body in the development of the sintered body according to the invention, we have studies on various sintered bodies produced from thermoplastic resins including polyethylene, polypropylene, polyvinylchloride, polymethylmetharylate, polystyrene and ABS resins. However, the porosities of the sintered bodies obtainable from these resins are reduced due to too rapid fusing of the resin particles, since these have the inherent tendencies of abrupt decrease in viscosity as the temperature raises. In addition, they are devoid of the structures for rendering the same highly hydrophilic to result in non-hydrophilic or only poorly hydrophilic even if a little hydrophilic properties are observed.

It has been also found by the present invention that said thermoplastic acrylonitrile copolymer according to the invention may be not only used singly to attain the aimed objects, but also may be mixed with one or a mixture of the addition resins miscible therewith and having substantially equal softening points. These addition resins include copolymers of acrylonitrile and styrene, ABS resins, 6-nylon, polyvinylchloride, polymethylmethacrylate, copolymers of ethylene and methylacrylate, copolymers of ethylene and vinyl alcohol, and polycarbonate. The content of the acrylonitrile copolymer of the invention may preferably be from 10 to 60% by weight based on the weight of the total amounts of the copolymer and the addition resin to considerably improve the sintering properties of these addition resins and to make it possible to produce sintered bodies of desirous property from the blended mixtures. It should be noted here that there are many other resins as referred to above which are miscible with the acrylonitrile copolymer of the invention and have substantially equal softening points as that of the latter and which may be improved in their sintering properties when mixed with the latter. All of such resins should be construed as the equivalents of the addition resins referred to above as the representative ones which may be remarkably improved in sintering properties and also in the properties of the final products. The mixed ratio of the acrylonitrile copolymer of the invention may preferably be more than 10% by weight, since the aimed improvement in property can not be attained if the content thereof is in short of 10% by weight. A content of up to 60% by weight of the acrylonitrile copolymer according to the invention may generally suffice for the blended mixture to have the desired properties.

Irrespective of whether the thermoplastic acrylonitrile copolymer resin of the invention is used singly or blended with any other resin miscible with and having a substantially equal softening point as mentioned above, the resin or the resin mixture shall be finely pulverized prior to sintering for producing the sintered body of the invention. Pulverization may be carried out physically using a mechanical powdering machine or otherwise by means of a chemical method wherein the acrylonitrile copolymer resin or a blend thereof with other resins is firstly dissolved in a pertinent solvent such as dimethylformamide and then added with a non-solvent such as alcohols or hydrocarbons to crystallize for forming precipitates followed by evaporation of the solvent and non-solvent to obtain powders of desired size. A particle size of 1 to 5000 microns in diameter is preferred. If the particle size is out of this range, i.e. smaller than 1 micron or larger than 5000 microns, the porosity of the final sintered body is lowered.

Generally speaking, a finer particle may be easily obtained by a chemical method rather than by a physical method. Particles respectively obtained by physical and chemical methods may be simply mixed to be presented for the applied use. When the acrylonitrile copolymer resin of the invention is mixed with any other resin which is miscible with the former and has a substantially equal softening point as the former to form a blended powder, both resins may be preliminarily heated to melt and kneaded to obtain pellets which are then simply pulverized in the atmosphere or in contact with the liquified nitrogen. The sintering property is not differentiated so much if the separately prepared powders of both resins are simply mixed to form a uniform mixture.

The thus prepared pulverulent resin is sintered at about 200° C. to 300° C. for 10 to 30 minutes, preferably for 15 to 25 minutes, under an atmospheric or raised pressure. When the sintering is effected under a raised pressure, the starting material is charged into a mold at room temperature and then compressed under a pressure of up to 1000 kg/cm$^2$. During this sintering step, the polypyridine ring structures mentioned above are formed to render the sintered body highly hydrophilic.

The sintering property and workability may be improved by the addition of, prior to sintering, an inorganic filler such as calcium carbonate, graphite, carbon black, barium sulfate, calcium sulfate, silica, diatomaceous earth, bentonite, Shirasu balloon (pumic stone micro balloon available in Kyushu, Japan) or kaolin. A coloring agent which is insoluble in an inorganic or organic solvent and resistant against heat may be added as well. It is preferred that the content of said inorganic filler and/or coloring agent be less than about 50% by weight of the total weight of the mixture, since the sintering property might be deteriorated to make it impossible to obtain a porous sintered body of desired property if the content of such constituents is increased more than 50% by weight.

The highly hydrophilic and porous sintered body produced in accordance with the invention has a porosity of about 10 to 50%, a Shore hardness of 70 to 98 degrees, preferably 80 to 98 degrees, and a hydrophilic degree of 1 to 10 minutes, and it is smooth in surface finishing and increased in strength.

The highly hydrophilic and porous sintered body of the invention may be used in a wide variety of applications, inter alia it may be used in the following applications with remarkable advantages:
(1) To impregnate, retain and store other substances in fine pores;
(2) To use as a filter;
(3) To make use of the pressure dropping function;
(4) To produce a light weight sintered body.

One exemplary application of the porous sintered body of the invention which may be included in item (1) above is an inking roller made thereof. The sintered body of the invention is a hard and porous body having a relatively high porosity, so that the inking roller made thereof can carry a large amount of ink and it is increased in mechanical compression strength and solvent-proof property, compatible with any inks and excellent in organization and smoothness of the surface. Other than the inking roller, the property as such is advantageous when the sintered body is used in the writing instruments particularly as the tip of the sign pen. As to the specific examples of application set forth in item (2) above, it may be used as superior filters for separating water from gasoline used in an automobile and from kerosene used in a stove. As an example of favourable applications set forth in item (4) above, there may be mentioned a material for making a speaker, which is of lightweight and has good acoustic properties.

The wording of "hydrophilic degree" as used and defined throughout the specification and claims is determined by the JIS (Japanese Industrial Standard) R-6127 method. The Shore hardness means the Shore D hardness.

EXAMPLES OF THE INVENTION

EXAMPLE 1

1 kg of a thermoplastic resin pellet (Trade Name of Barex R-210 produced by Vistron Corp.), which had been prepared by graft-copolymerizing butadiene with a copolymer of acrylonitrile and methylacrylate, was mechanically pulverized in a ball mill in the presence of liquified nitrogen to obtain a powder of about 60 meshes in average particle size. This powder is then charged into an iron cylinder of 26 mm in diameter and 50 mm in height, and sintered at 280° C. for 10 minutes while applying a pressure of 10 kg/cm$^2$ from the top and bottom faces. The porous body was put out of the mold after cooling and the properties thereof were determined. The porosity was 40%, the Shore hardness was 95 and the hydrophilic degree was 1.5 minutes. The surface of the thus obtained sintered body was smooth and excellent in finishing. The molded article was used as an inking roller after being allowed to stand for 6 months in air at room temperature under the atmospheric pressure, and it still revealed a fine printing property.

EXAMPLE 2

500 g of a powder mixture containing uniformly mixed 51% by weight of the thermoplastic resin powder obtained in the preceding Example 1 and 49% by weight of calcium carbonate was put between iron plates and heated to sinter at 260° C. for 15 minutes. The porosity of the thus produced porous body was 43%, the hydrophilic degree was 1 minute and the Shore hardness was 82.

EXAMPLE 3

A powder mixture containing uniformly mixed 50% by weight of the thermoplastic resin powder obtained in Example 1 and 50% by weight of a polycarbonate powder of 60 meshes in average powder size was put into a glass tube applied with a silicone resin lining and having the dimensions of 10 mm in internal diameter and 50 mm in height, and heated to sinter at 280° C. for 30 minutes in an oil bath. The porosity of the resultant porous body was 38%, the hydrophilic degree thereof was 2.3 minutes and the Shore hardness thereof was 96. This porous body was used as a tip of a sign pen which ran smoothly and supplied a good flow of ink.

EXAMPLE 4

5 kg of the same resin pellet as used in Example 1 and 1 kg of a copolymer of acrylonitrile and styrene were mixed and kneaded in a Bumbury's mixer at 200° C. to prepare a particle which was pulverized in an ordinary powdering machine to obtain a powder of 18 to 24 meshes. This powder was heated and sintered generally in accordance with the procedure as in Example 1 to produce a cylindrical sintered body. The porosity was 42%, the hydrophilic degree was 1.6 minutes and the Shore hardness was 83.

For the comparison purpose, 1 kg of the copolymer of acrylonitrile and styrene was separately and singly pulverized using an ordinary powdering machine to obtain a powder of 50 meshes in average particle size. This powder was sintered at 180° C. for 10 minutes similarly as in Example 1 to produce a cylindrical sintered body. The porosity was 25% and the Shore hardness was 68. However, the hydrophilic degree was so poor as 14.0 minutes.

The cylindrical sintered bodies according to the invention and made singly of the copolymer of acrylonitrile as mentioned above were subjected to filtering test wherein muddy water of 3 meters in transparency was filtered through both of the sintered bodies. It was revealed by this comparison test that the cylindrical sintered body of the present invention was capable of filtering the sample water to have the transparency of 15 meters for 3 hours, whereas with the use of the comparative cylindrical sintered body the same transparency was not attained until after filtering for 6 hours under the same conditions.

EXAMPLE 5

Following to similar procedures as in Example 4 except in that the polymers as set forth in Table 1 below were used in place of the copolymer of acrylonitrile and styrene to produce sintered bodies. The properties of the thus produced sintered bodies are shown in Table 1.

TABLE 1

| Sintered Body | Addition resin | ABS Resin | 6-Nylon | Polyvinyl-chloride | Polymethyl-methacrylate | Ethylene-acrylate Copolymer | Ethylene-vinylalcohol Copolymer |
|---|---|---|---|---|---|---|---|
| Porosity (%) | | 39 | 48 | 46 | 41 | 38 | 43 |
| Hydrophilic Degree (min.) | | 2.2 | 1.8 | 9.3 | 3.5 | 4.3 | 1.0 |
| Shore Hardness | | 78 | 97 | 93 | 91 | 81 | 87 |

While the present invention has been described with reference to the specific examples, it should be understood that the invention is not restricted to such examples, but any change and modification may be made within the spirit and scope of the present invention as recited in the appended claims.

What is claimed is:

1. A highly hydrophilic and porous sintered body having open-cellular pores and substantially precluded from further curing and treatment with an alkali, consisting essentially of a polypyridine ring structure represented by the following formula of:

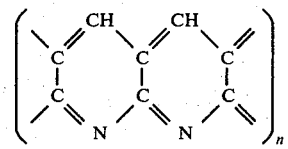

wherein n is an integer, which is obtained by sintering a pulverized copolymer of 1 to 5000 microns in diameter made from acrylonitrile, a conjugated diene monomer and an α,β-unsaturated olefinic carboxylic ester represented by the following formula of

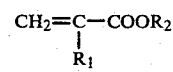

wherein $R_1$ is hydrogen, a lower alkyl group having 1 to 4 carbon atoms or a halogen; and $R_2$ is an alkyl group having 1 to 6 carbon atoms, said pulverized copolymer being thermoplastic before sintering, and said sintering being effected at 200° C. to 300° C. for 10 to 30 minutes under a pressure of from ambient pressure to 1000 kg/cm$^2$, wherein said sintered body has a porosity of 10 to 50%, a Shore hardness of 70 to 98 degrees and a hydrophilic degree of 1 to 10 minutes.

2. A highly hydrophilic and porous sintered body according to claim 1, wherein an addition resin miscible with said copolymer and having a softening point substantially equal to that of said copolymer is added prior to sintering.

3. A highly hydrophilic and porous sintered body according to claim 2, wherein the content of said copolymer ranges from 10 to 60% by weight based on the weight of the total amounts of the copolymer and said addition resin, and wherein said addition resin is one or more selected from the group consisting of a copolymer of acrylonitrile and styrene, an ABS resin, 6-nylon, polyvinylchloride, polymethylmethacrylate, a copolymer of ethylene and methylmethacrylate, a copolymer of ethylene and a vinylalcohol, and polycarbonate.

4. A highly hydrophilic and porous sintered body according to claim 2, further comprising an inorganic filler and/or a coloring agent.

5. A highly hydrophilic and porous sintered body according to claim 4, wherein the content of said inorganic filler and/or said coloring agent is up to 50% by weight of the total weight of the sintered body, and wherein said inorganic filler is one or more selected from the group consisting of calcium carbonate, graphite, carbon black, barium sulfate, calcium sulfate, silica, diatomaceous earth, bentonite, Shirasu balloon and kaoline.

6. A highly hydrophilic and porous sintered body according to claim 1, wherein said conjugated diene monomer is selected from the group consisting of butadiene-1,3, isoprene, chloroprene, bromoprene, cyanoprene, 2,3-dimethyl-butadiene-1,3 and 2-ethyl-butadiene-1,3.

* * * * *